US009085204B2

(12) United States Patent
Bertrand

(10) Patent No.: US 9,085,204 B2
(45) Date of Patent: Jul. 21, 2015

(54) ATTACHMENT FOR TIRE MOUNTING MACHINE

(76) Inventor: Tony Bertrand, Hornick, IA (US)

( * ) Notice: Subject to any disclaimer, the term of this patent is extended or adjusted under 35 U.S.C. 154(b) by 963 days.

(21) Appl. No.: 13/240,473

(22) Filed: Sep. 22, 2011

(65) Prior Publication Data

US 2013/0075044 A1     Mar. 28, 2013

Related U.S. Application Data

(60) Provisional application No. 61/387,225, filed on Sep. 28, 2010.

(51) Int. Cl.
*B60B 30/06*      (2006.01)
*B60C 25/05*      (2006.01)

(52) U.S. Cl.
CPC ....... *B60C 25/0539* (2013.04); *Y10T 29/49998* (2015.01)

(58) Field of Classification Search
CPC .... B60C 25/02; B60C 25/025; B60C 25/132; B60C 25/0545; B60C 25/135; B60C 25/00; B60C 25/01; B60C 25/0521; B60C 25/053; B60C 25/0527; B60C 25/0539

USPC .......... 157/16, 1.17, 1.21, 21, 14, 1.22, 1.24; D8/31

See application file for complete search history.

(56) References Cited

U.S. PATENT DOCUMENTS

| | | | | |
|---|---|---|---|---|
| 4,061,173 | A | * | 12/1977 | Daly ............................ 157/1.17 |
| 4,267,867 | A | * | 5/1981 | du Quesne ....................... 157/17 |
| 4,750,538 | A | | 6/1988 | du Quesne |
| 6,039,104 | A | | 3/2000 | Cunningham et al. |
| 6,062,289 | A | | 5/2000 | Cunningham et al. |

* cited by examiner

*Primary Examiner* — Lee D Wilson
*Assistant Examiner* — Melanie Alexander
(74) *Attorney, Agent, or Firm* — McKee, Voorhees & Sease, PLC

(57) ABSTRACT

A clamping attachment for assisting in securing a small tire rim to a tire-mounting machine having a plurality of clamping members is provided. The clamping attaching includes a first portion having a lip and a recess for providing clamping forces to a tire rim. The attachment also includes second and third portions for aiding in attaching the attachment to existing clamping members of a tire-mounting machine. The clamping attachments are used with tires having smaller diameters than what the tire-mounting machines are capable of securing to the tabletop under normal operating conditions. The attachments are configured to be quickly added to the machines to provide for securing the rims to the machine in order to add or remove a tire from the rim.

19 Claims, 5 Drawing Sheets

ATTACHMENT FOR TIRE MOUNTING MACHINE

CROSS-REFERENCE TO RELATED APPLICATIONS

This application claims priority under 35 U.S.C. §119 to provisional application Ser. No. 61/387,225 filed Sep. 28, 2010, herein incorporated by reference in its entirety.

FIELD OF THE INVENTION

The present invention relates generally to an improved tire-mounting machine for replacing a tire on a rim. More particularly, but not exclusively, the invention relates to a clamping attachments for securing small tires to tire mounting machines.

BACKGROUND OF THE INVENTION

Tire mounting machines have been known and used for many years. The machines aid in the process of removing a tire from a rim, and also in replacing the tire with a new one to the same rim. The tire-mounting machine improves efficiency in replacing the tires, which increases the productivity of tire shops, garages, dealerships, and other automobile businesses in being able to change tires for a customer's vehicle rather quickly and with minimal physical work.

Most tire mounting machines include a tabletop to which the tire and rim are mounted upon before removing the tire from the rim. On these tabletops are sometimes found an adjustable set of clamps or jaws. The clamps or jaws attach to a bottom lip of the rim of the tire to secure the tire to the tabletop during the removal process. In addition, the clamps or jaws are sometimes adjustable to be able to handle a varying range of tire and rim sizes. However, the range is limited and generally do not accommodate smaller tires and rims. For example, standard machines can only be adjusted to handle a minimum rim diameter of six inches. Some items, such as lawnmowers, wheelbarrows, two-wheel dolleys, and snow blowers, have tires with rim diameters of only four or five inches. Therefore, the standard machines are not able secure the tire and rims, nor are they able to remove the tires from the rims.

Methods do exist for removing the tires from the smaller rims. One method involves a person manually wedging the tire off the rim with a shaft or bar. However, this method is both difficult and time consuming. Because physical force is used, there is also the possibility that the rim could be damaged.

Another method involves the addition of bulky items to the tabletop to replace the standard jaws or clamps to secure the smaller rims to the tire-mounting machine. The addition may be a circular plate, which is heavy, difficult to attach to the table top, and difficult to store due to the size and weight of the plate. Another method involves a set of jaw or clamp covers that are placed over the clamps on the tabletops. Again, the covers are bulky and are difficult to store. In addition, the clamp covers are limited as to the type of tire mounting machines that they can work with, and to the rim diameter that they are able to work with. The covers are generally used with ATV tires, which are larger than four to five inches. The covers are used to raise the tires instead of being able to reduce the diameter of the standard jaws or clamps.

Therefore, there is a need in the art for an attachment and method of use that allows a user to reduce the diameter of the jaws or clamps of standard tire mounting machines to allow the machine to remove tires from rims having diameters generally of five inches and less.

SUMMARY OF THE INVENTION

It is therefore a primary object, feature, and/or objective of the present invention to provide an improved tire removal method and apparatus, without the deficiencies in the prior art.

It is another object, feature, and/or objective of the present invention to provide a method and apparatus for securing a tire having a small rim to a tire-mounting machine.

It is another object, feature, and/or objective of the present invention to provide a method and apparatus for attaching to different models of tire mounting machines It is another object, feature, and/or objective of the present invention to provide a plurality of attachments for a tire-mounting machine that can be easily stored in a minimal area of a shop.

It is another object, feature, and/or objective of the present invention to provide a system that can be used to remove a tire from a rim having a diameter of five inches or less.

It is another object, feature, and/or advantage of the present invention to provide a method of securing a tire having a small rim to a tire-mounting machine using a plurality of clamp attachments.

It is another object, feature, and/or advantage of the present invention to provide an improved tire mounting machine attachment made of a one-piece body for attaching to the clamps of a tire-mounting machine.

It is another object, feature, and/or advantage of the present invention to provide an improved method and apparatus that reduces the amount of time to remove a tire from a small rim using a tire-mounting machine.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the present invention, a clamping attachment for securing a small tire rim to a tire-mounting machine having a plurality of clamping members is provided. The clamping attachment includes a one-piece body operatively attached to at least one of the plurality of clamping members, the clamping attachment having a rim-engaging interface.

According to another aspect of the present invention, a tire-mounting machine for securing a small tire having a rim for replacing a tire on the rim is provided. The machine includes a tabletop for receiving the tire. A plurality of clamping members is radially mounted on the tabletop. A plurality of clamping attachments is operably attached to the clamping members.

According to another aspect of the present invention, a method of securing a small tire having a rim to a tire-mounting device having a tabletop and a plurality of clamping members radially mounted on the table top is provided. The method includes mounting a plurality of clamping attachments to the plurality of clamping members. The rim of the small tire is set between the plurality of clamping attachments. The plurality of clamping members and the plurality of clamping attachments are moved radially inward to engage the rim and thereby secure the tire to the tire-mounting machine.

DETAILED DESCRIPTION OF THE PREFERRED EMBODIMENTS

Figure 1:
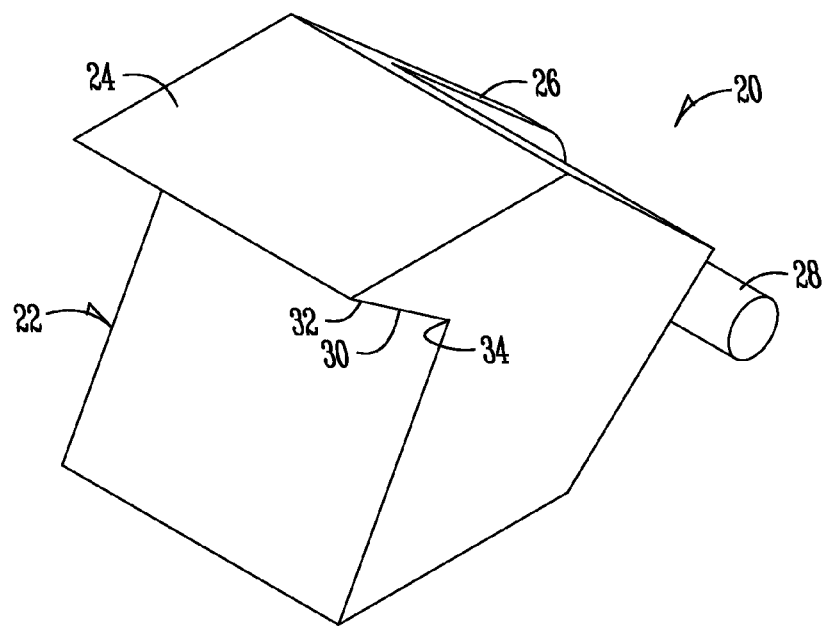
FIG. 1 is a perspective view of a clamping attachment for a tire-mounting machine.
Figure 2:
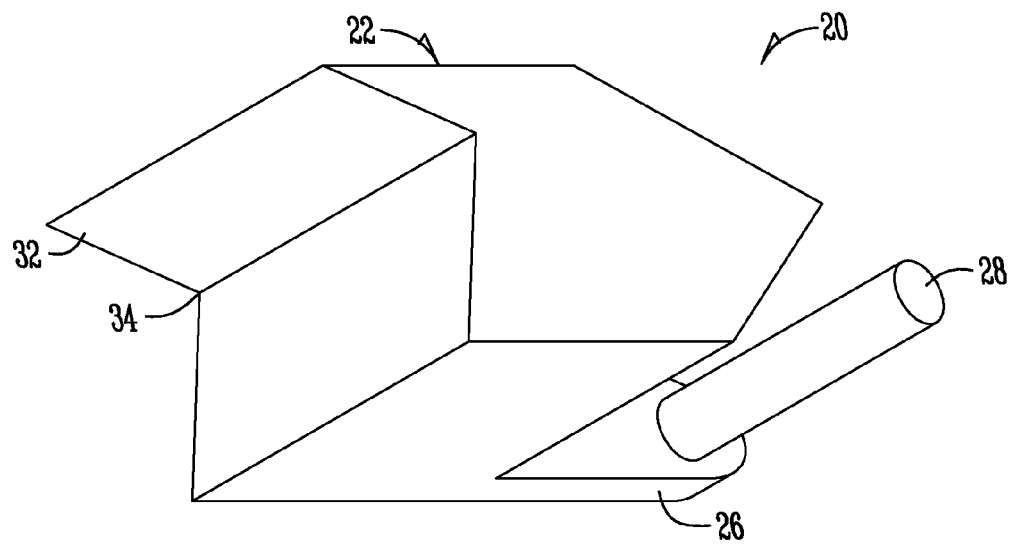
FIG. 2 is a perspective view of the clamping attachment of FIG. 1 from another perspective.

FIGS. 1 and 2 are perspective views of a clamping attachment 20 for use with a tire-mounting machine 10. The clamping attachment 20 is made from a one-piece body, which includes a first portion 24, a second portion 26, and a third portion 28. In the embodiments shown in FIGS. 1 and 2, the clamping attachment comprises cast aluminum. The present invention also contemplates that the clamping attachment 20 is milled or otherwise machined from a piece of aluminum. However, the three portions may also be individually manufactured, cast, molded, or machined, and welded or otherwise attached to one another. In addition, other materials, such as steel or the like, may be used to construct the attachment. The first portion 24 of the clamping attachment 20 includes a rim-engaging interface 30 for clamping a rim 44 of a tire 42 to a tire-mounting machine 10 such that a tire 42 may be either removed from or added to the rim. The first portion 24 may also include a lip 32 and a recess 34 to aid in receiving the rim. As will be discussed below, the rim-engaging surface or interface 30 is configured to hold a tire rim 44 to a tire-mounting machine 10.

The second portion 26 of the clamping attachment 20 extends generally from the first portion 24, and the third portion 28 extends from the second portion 26. Therefore, the second portion 24 of the clamping attachment 20 may generally be referred to as a connecting piece between the first and third portions. The third portion is configured to extend from the second portion such that the third portion is able to engage a clamp member 12 of the tire-mounting machine 10 to attach the clamping attachment 20 to the clamping member. As shown in the Figures, the third portion 28 is generally cylindrical; however, other embodiments of the clamping attachment 20 may include third portions of other shapes and configurations. The shape and size of the third portion 28 will coincide with the shape and type of clamping member 12 of different brands and models of tire-mounting machines.

Figure 3:
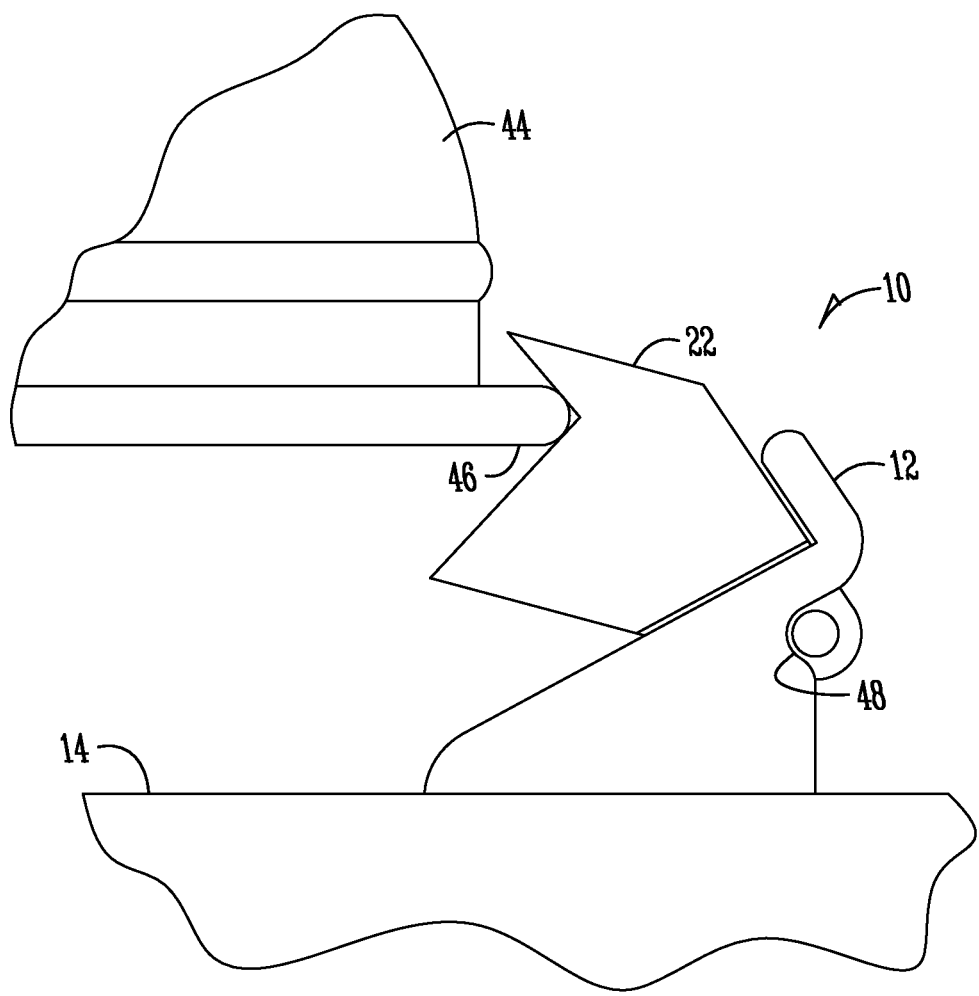
FIG. 3 is an enlarged view showing a clamping attachment engaging a rim.

FIG. 3 is an enlarged view showing a clamping attachment 20 of the present invention engaging a tire rim 44. The rim 44 would be associated with a tire of a device having smaller tires. Such devices or machines may include lawnmowers, wheelbarrows, dolleys, snow blowers, or the like. While these specific devices have been given, it should be appreciated that other devices employing the use of smaller tires and rims that may also be used with the present invention. As shown in FIG. 3, the clamping attachment includes a lip 32 and a recessed portion 34. When the attachment is slidably mounted on to the clamping member, the attachment is able to move with the clamping member along the guides 18 of the tire-mounting machine 10. Therefore, the plurality of clamping attachments and clamping members are moved along the guides toward the center of the tabletop 14 until they engage a rim 44. Hydraulics hold the attachments and clamping members in place, thus clamping the rim 44 to the tire-mounting machine 10. The lip 32 of the clamping attachment is generally above a lower edge portion of the rim and the recess of the clamping attachment is configured to receive a lip or edge 46 of the rim 44. The configuration of the lip and recess allows the clamping attachment to surround a portion of a rim. The lip and recess also allow the clamping attachment to be able to hold a rim in position for use with the tire-mounting machine. Because of the configuration (size and shape) of the first portion, the attachment applies a downward force on the rim to hold the rim in place.

Figure 4:
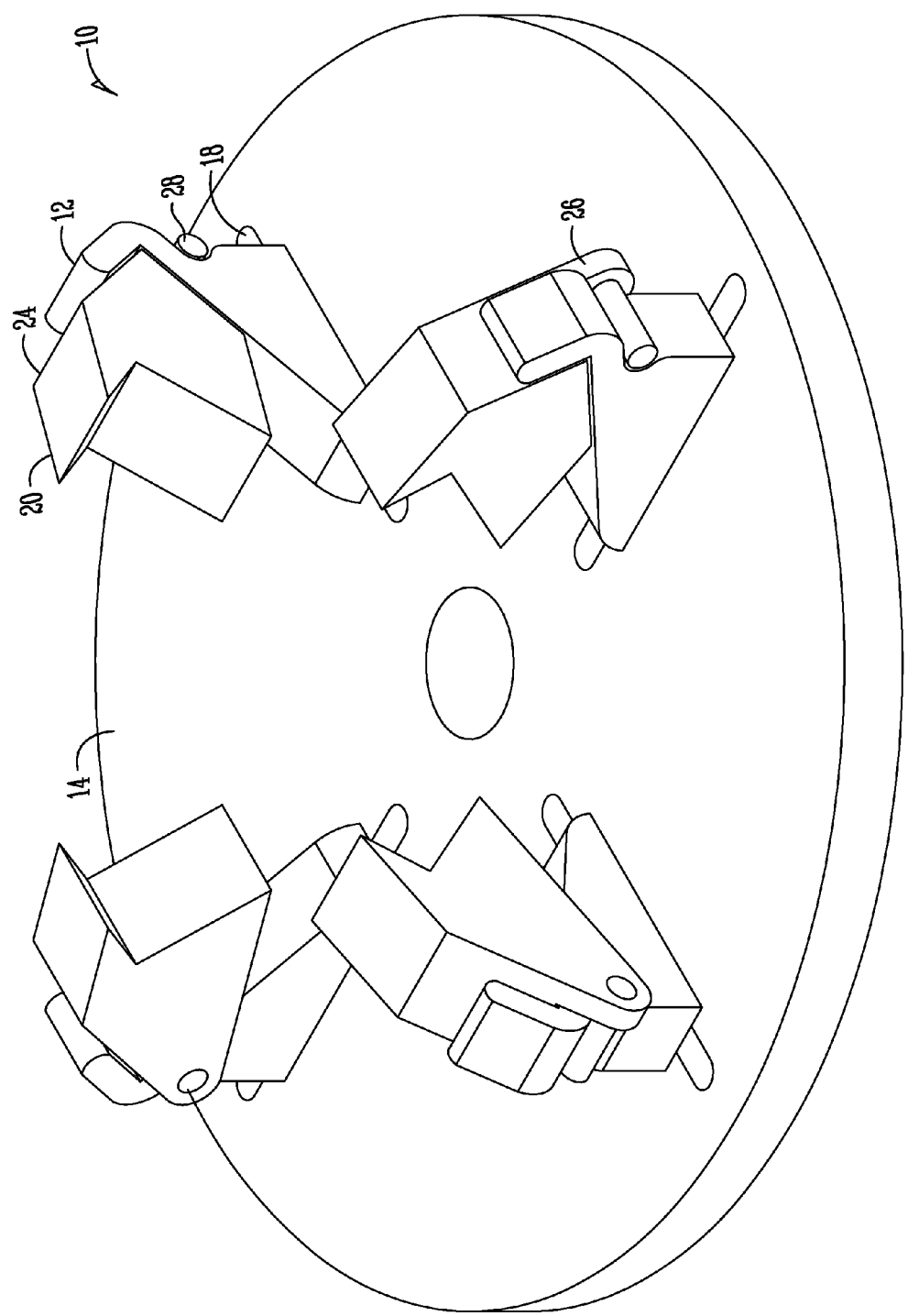
FIG. 4 is a view of a tire-mounting machine with a plurality of clamping attachments attached to a plurality of clamping members.

FIG. 4 is a view of the tire-mounting machine showing a plurality of clamping attachments 20 attached to a plurality of clamping members 12. The clamping members 12 are located on a tabletop 14 of the tire-mounting machine 10. The clamping members are moveable in relation to the tabletop along guides 18 located on the tabletop. The guides 18 allow the plurality of clamping members 12 to move to and from the outer edge of the tabletop. The movement allows the clamping members to clamp and hold a variety of sizes of tires and rims. The clamping attachments 20 are added to allow the tire-mounting machine 10 to receive, clamp, and hold tires having smaller radii. As shown in FIG. 4, the number of tire clamping attachments 20 will be equal to the number of clamping members 12 of the tire-mounting machine 10. This ensures the greatest stability for clamping a tire to the tire-mounting machine.

The clamping attachments 20 attach to the clamping member as follows. A rear side of the first portion 24 of the clamping attachment 20 is configured to be received by a recess in the clamping member 12. Additionally, the second portion 26 of the clamping attachment extends rearwardly away from the first portion enough to allow the third portion 28 to be spaced from the first portion a distance equal to or greater than the thickness of the clamping member. The configuration allows the clamping attachment to be quickly attached to the clamping member, yet the attachment is secured to the member as well. The third portion of the clamping attachment is configured to matingly engage a groove or notch 48 formed in the clamping member 12. Therefore, the clamping attachments 20 may be slid onto one side of the clamping members 12. The sliding connectivity between the clamping attachment 20 and the clamping member 12 allows the clamping attachments to be connected to the members and thus, tire mounting machine 10, in an efficient and quick manner, and without the use of tools or fasteners.

Figure 5:
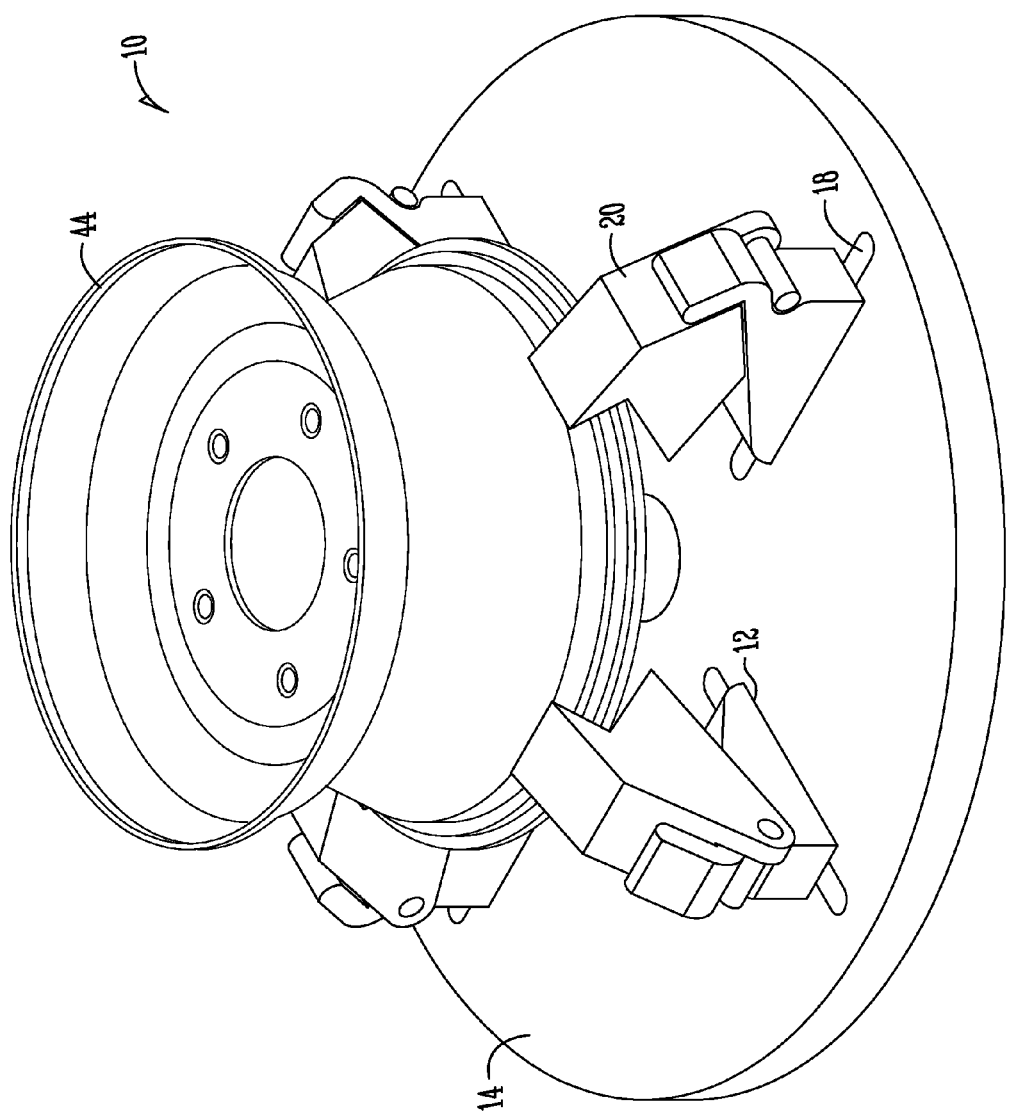
FIG. 5 is a perspective view of a small rim secured to the tabletop of the tire-mounting machine by the plurality of clamping attachments.

FIG. 5 is a perspective view a rim 44 with a smaller radius secured to a tabletop 14 of a tire-mounting machine 10 by a plurality of clamping attachments 20. As previously noted, the number of attachments will be equal to the number of clamping members 12 on the tabletop 14. In use, the plurality of clamping attachments is connected to a plurality of clamping members on the tabletop. The rim 44, either with or without a tire 42, is then placed near a central portion of the tabletop. The clamping attachment and clamping member assemblies are then moved inwardly along guides 18 toward the rim, and are moved until engagement with the rim. Hydraulics, pneumatics, or other power may be used to move the attachments. When the attachments are surrounding a portion of the rim, the attachments work as a clamp to hold the rim in position on the tabletop.

If a tire is still on the rim, a wedge member (not shown) may be used to wedge the tire from the rim while the tabletop is rotated about the tire-mounting machine. The engagement of the attachments 20 to the rim 44 must be sufficient to keep the rim from spinning or becoming loose while removing the tire from the rim. As the guides 18 only allow movement of the clamping members 12 a limited amount, the addition of the attachments 20 will create the needed clamping forces on tires having smaller radii. When the tire has been removed and a new tire has been added to the rim, the clamping attachment and members will be moved outwardly along the guides and away from the center of the tabletop to release the rim from the clamping position. The tire can then be removed from the tire-mounting machine and a new one can be put in its place, as needed.

Figure 6A:
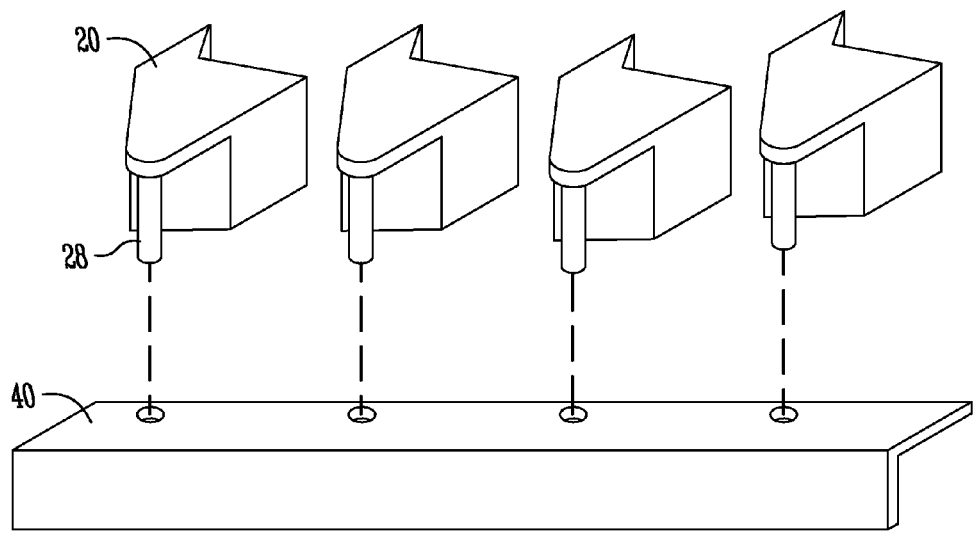
FIGS. 6A-C are perspective views of the plurality of clamping attachments and a wedge member stored in a storage bracket.
Figure 6B:
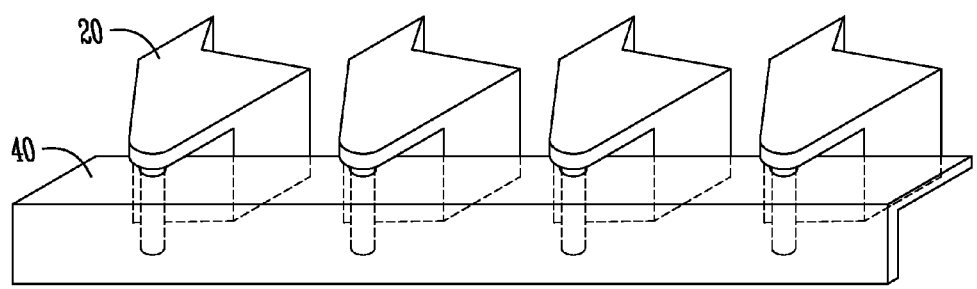
Figure 6C:
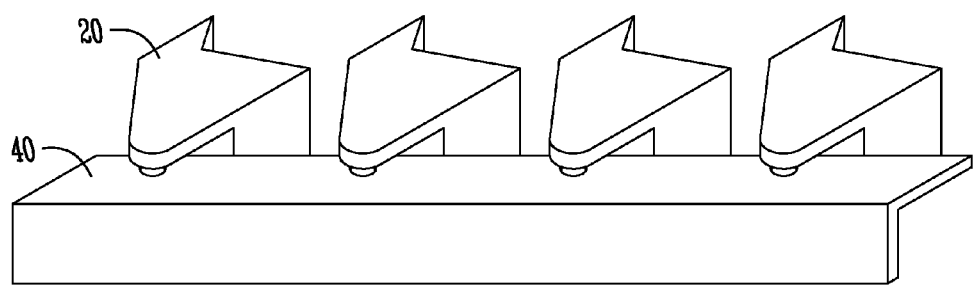

FIGS. 6A-C are perspective views showing the plurality of clamping attachments 20 and a storage bracket 40 for use in storing the attachments. The storage bracket 40 may be a piece of angle iron with a plurality of holes therein. The holes will correspond in size and shape with the size and shape of the third portions of the clamping attachments. Therefore, as shown in FIGS. 6A-C, the clamping attachments are able to be stored in a neat and orderly manner. The angle bracket 40 may be placed in a shop or garage on a wall or in connection with the tire-mounting machine itself, such that the attachments can be quickly removed therefrom and added to the tire-mounting machine. As shown in FIGS. 6A-C, because the attachments are stored in the bracket by sliding the third portion of the attachment through a hole in the bracket, the attachments may be removed from the bracket quickly to be added to the tire-mounting machine. When finished, the attachments may also be quickly placed back to the bracket member so that another user may find them in the same location.

A general description of the present invention as well as a preferred embodiment of the present invention has been set forth above. Those skilled in the art to which the present invention pertains will recognize and be able to practice additional variations in the methods and systems described which fall within the teachings of this invention. For example, the size and shape of the portions of the clamping attachment may be varied according to different tire-mounting machines. The material of the components may also be varied. Accordingly, all such modifications and additions are deemed to be within the scope of the invention, which is to be limited only by the claims appended hereto.

What is claimed is:

1. A clamping attachment for securing a small tire rim to a tire-mounting machine having a plurality of clamping members, comprising:
   a one-piece body operatively attached to at least one of the plurality of clamping members, the clamping attachment having a rim-engaging interface;
   said one-piece body configured to be positioned generally within a notched rim-engaging surface of the clamping members so as to extend inwardly from the clamping members; and
   said one-piece body including a portion substantially contoured to the notched rim-engaging surface of the clamping members.

2. The clamping attachment of claim 1 wherein the one-piece body further comprises:
   i. a first portion having the rim engaging interface;
   ii. a second portion extending at least partially from the first portion; and
   iii. a third portion extending at least partially from the second portion and configured to attach to one of the plurality of clamping members of the tire-mounting machine.

3. The clamping attachment of claim 2 wherein the rim-engaging interface comprises a lip and a recess adjacent the lip.

4. The clamping attachment of claim 3 wherein the recess is configured to receive a portion of the tire rim.

5. The clamping attachment of claim 4 Wherein the lip is configured to at least partially surround the portion of the tire rim.

6. The clamping attachment of claim 2 wherein said second portion of the clamping attachment is the portion substantially contoured to the notched rim-engaging surface of the clamping members.

7. The clamping attachment of claim 2 wherein the third portion is a cylinder.

8. The clamping attachment of claim 1 wherein the one-piece body is formed by casting.

9. A tire-mounting machine for securing a small tire having a rim for replacing a tire on the rim, comprising;
   a tabletop for receiving the tire;
   a plurality of clamping members radially mounted on the table top; and
   a plurality of clamping attachments operably attached to the clamping members;
   said clamping attachments configured to be positioned generally within a notched rim-engaging surface of the clamping members so as to extend inwardly from the clamping members; and
   said clamping attachments substantially contoured to the notched rim-engaging surface of the clamping members.

10. The tire mounting machine of claim 9 wherein the plurality of clamping attachments extend the reach of the plurality of clamping members to secure the small tire to the table top of the tire mounting machine.

11. The tire mounting machine of claim 9 wherein the plurality of clamping attachments comprise one-piece bodies.

12. The tire mounting machine of claim 11 wherein the plurality of clamping attachments comprise a first portion having a rim engaging interface; a second portion extending at least partially from the first portion; and a third portion extending at least partially from the second portion and configured to attach to one of the plurality of clamping members of the tire mounting machine.

13. The tire mounting machine of claim 12 wherein the first, second, and third portions of the clamping attachments at least partially surround the clamping members.

14. A method of securing a small tire having a rim to a tire mounting device having a table top and a plurality of clamping members radially mounted on the table top, comprising:
   mounting a plurality of clamping attachments to the plurality of clamping members;
   setting the rim of the small tire between the plurality of clamping attachments; and
   moving the plurality of clamping members and the plurality of clamping attachments radially inward to engage the rim and thereby secure the tire to the tire-mounting machine;
   said clamping attachments configured to be positioned generally within a notched rim-engaging surface of the clamping members so as to extend inwardly from the clamping members; and
   said clamping attachments substantially contoured to the notched rim-engaging surface of the clamping members.

15. The method of claim 14 further comprising removing air from the tire before setting the rim of the small tire between the plurality of clamping attachments.

16. The method of claim 14 wherein the plurality of clamping members and the plurality of clamping attachments move inward or outward relative to the table top of the tire mounting machine.

17. The method of claim 14 further comprising removing the plurality of clamping attachments from a storage bracket before attaching the plurality of clamping attachments to the plurality of clamping members.

18. The method of claim 14 wherein the clamping attachments comprise a first portion having a rim engaging interface; a second portion extending at least partially from the first portion; and a third portion extending at least partially from the second portion and configured to attach to one of the plurality of clamping members of the tire mounting machine.

19. The method of claim 18 wherein the first portion and the third portion of the clamping attachments are on opposite sides of the clamping members.

\* \* \* \* \*